United States Patent
Kokubo et al.

(10) Patent No.: US 10,723,063 B2
(45) Date of Patent: Jul. 28, 2020

(54) APPARATUS FOR MANUFACTURING MOLDED BODY ASSEMBLY

(71) Applicant: TOSHIBA KIKAI KABUSHIKI KAISHA, Chiyoda-Ku, Tokyo (JP)

(72) Inventors: Mitsunori Kokubo, Numazu (JP); Yuki Sugiura, Mishima (JP); Toru Suzuki, Fuji (JP); Terukatsu Kuboki, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 16/148,515

(22) Filed: Oct. 1, 2018

(65) Prior Publication Data

US 2019/0105830 A1 Apr. 11, 2019

Related U.S. Application Data

(62) Division of application No. 14/432,694, filed as application No. PCT/JP2013/075697 on Sep. 24, 2013, now abandoned.

(51) Int. Cl.
*B29C 59/00* (2006.01)
*B29C 59/02* (2006.01)
*B29L 31/00* (2006.01)

(52) U.S. Cl.
CPC ............ *B29C 59/002* (2013.01); *B29C 59/02* (2013.01); *B29C 2059/023* (2013.01); *B29L 2031/001* (2013.01); *Y10T 428/24612* (2015.01)

(58) Field of Classification Search
CPC . B29C 59/002; B29C 59/02; B29C 2059/023; B29C 2031/001
See application file for complete search history.

(56) References Cited

U.S. PATENT DOCUMENTS

| 2003/0029553 A1 | 2/2003 | Toyoda |
| 2007/0134362 A1 | 6/2007 | Heidari |

(Continued)

FOREIGN PATENT DOCUMENTS

| JP | 2005-178368 | 7/2005 |
| JP | 2007-176039 | 7/2007 |

(Continued)

OTHER PUBLICATIONS

B.J. Choi et al., "Design of orientation stages for step and flash imprint lithography", Precision Engineering Journal of International Societies for Precision Engineering and Nanotechnology, 25 (2001), pp. 192-199.

(Continued)

*Primary Examiner* — Jacob T Minskey
*Assistant Examiner* — Melody Tsui
(74) *Attorney, Agent, or Firm* — DLA Piper LLP (US)

(57) ABSTRACT

An apparatus for manufacturing a molded body assembly includes: a to-be-molded body holder configured to hold a to-be-molded body placed thereon; a raw material roll placement portion in which a mold raw material roll is placed; a mold holder configured to hold a leading edge portion of an uncut mold extending from the mold raw material roll, and to move relative to the to-be-molded body holder; a transfer unit configured to transfer a fine transfer pattern of the uncut mold to the to-be-molded body placed on and held by the to-be-molded body holder, a cutting unit; and a controller configured to control the to-be-molded body holder, the mold holder, the transfer unit, and the cutting unit configured to cut the uncut mold at a predetermined position in a longitudinal direction thereof, thereby manufacturing a mold body assembly.

1 Claim, 7 Drawing Sheets

(56) References Cited

U.S. PATENT DOCUMENTS

| | | | |
|---|---|---|---|
| 2007/0205525 A1* | 9/2007 | Engl | B29D 11/00278 264/1.6 |
| 2008/0028958 A1 | 2/2008 | Park | |
| 2008/0122144 A1 | 5/2008 | Zhang | |
| 2010/0213169 A1 | 8/2010 | Hiraoka | |
| 2012/0326346 A1 | 12/2012 | Itani et al. | |
| 2013/0011507 A1 | 1/2013 | Itani | |
| 2013/0065007 A1 | 3/2013 | Hiraoka | |
| 2013/0319522 A1 | 12/2013 | Koike | |

FOREIGN PATENT DOCUMENTS

| | | |
|---|---|---|
| JP | 2010-199298 | 9/2010 |
| JP | 2011-020272 | 2/2011 |
| JP | 2011-183641 | 9/2011 |
| JP | 2011-183782 | 9/2011 |
| TW | M411347 | 9/2011 |
| TW | 201217153 | 5/2012 |
| TW | 2012-33527 | 8/2012 |
| WO | WO 2011-089836 | 7/2011 |
| WO | WO 2011/111546 | 9/2011 |
| WO | WO 2011114855 | 9/2011 |
| WO | WO 2012077738 | 6/2012 |

OTHER PUBLICATIONS

International Search Report issued in PCT/JP2013/075697 dated Nov. 26, 2013 with English Language Translation.
International Preliminary Report on Patentability issued in PCT/JP2013/075697 dated Apr. 7, 2015 with English Language Translation.
Written Opinion of the International Searching Authority issued in PCT/JP2013/075697 dated Nov. 26, 2013.
English Language Abstract and Translation for JP 2010-199298 published Sep. 9, 2010.
English Language Abstract and Translation for JP 2011-020272 published Feb. 3, 2011.
English Language Translation of Taiwanese Office Action issued in TW 102135335 dated Jan. 26, 2016.
English Language Abstract and Translation of JP 2005-178368 published on Jul. 7, 2005.
English Language Abstract and Translation of JP 2011-183782 published on Sep. 22, 2011.
English Language Abstract of TW 201217153 published on May 1, 2012.
English Language Abstract of TW 201233527 published on Aug. 16, 2012.
English Language translation of TWM411347 published on Sep. 11, 2011.
Japanese Office Action (with English Translation) dated Jun. 7, 2016 issued in JP 2012-219044.
Korean Office Action (with English Translation) dated May 20, 2016 issued in KR 10-2015-7010712.
English Language Abstract and Translation for JP 2007-176039 published Jul. 12, 2007.
English Language Abstract and Translation for JP 2011-183641 published Sep. 22, 2011.
English Language Abstract and Translation for WO 2011-089836 published Jul. 28, 2011.
U.S. Appl. No. 14/432,694 electronically captured on Jan. 4, 2019.

* cited by examiner

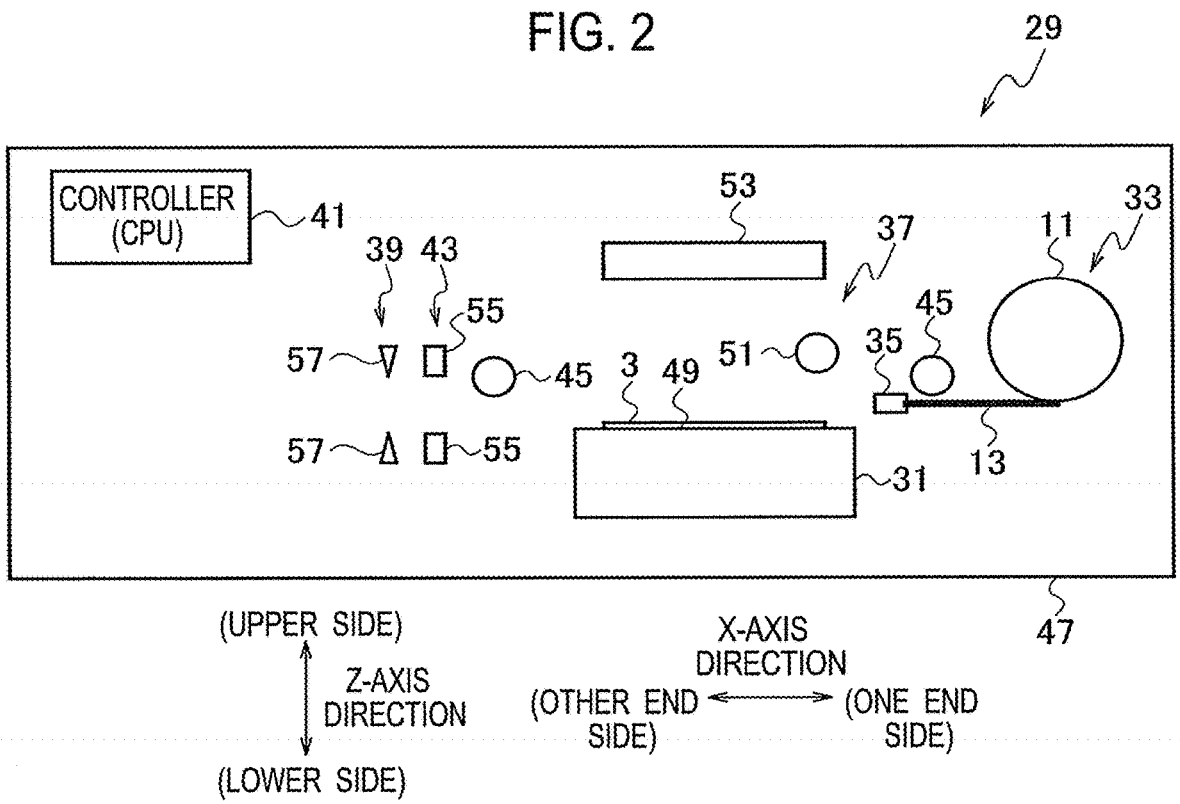
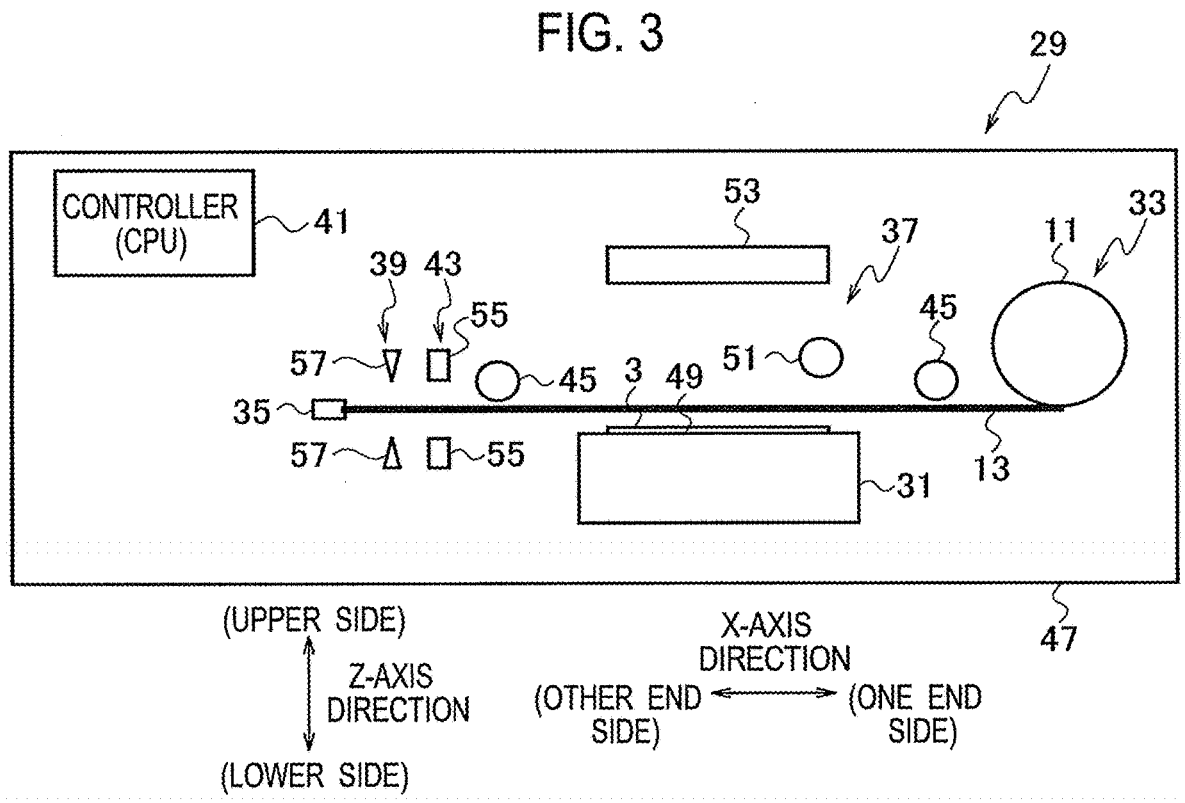

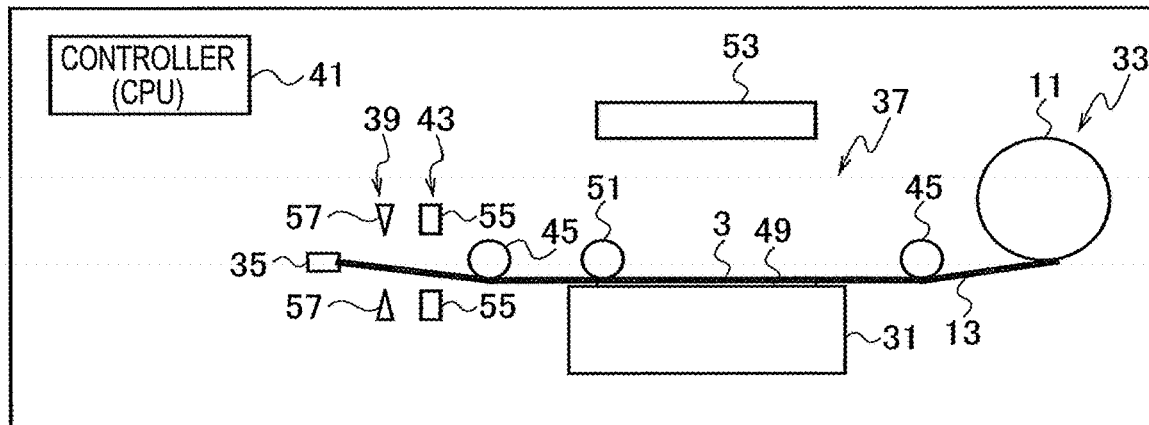
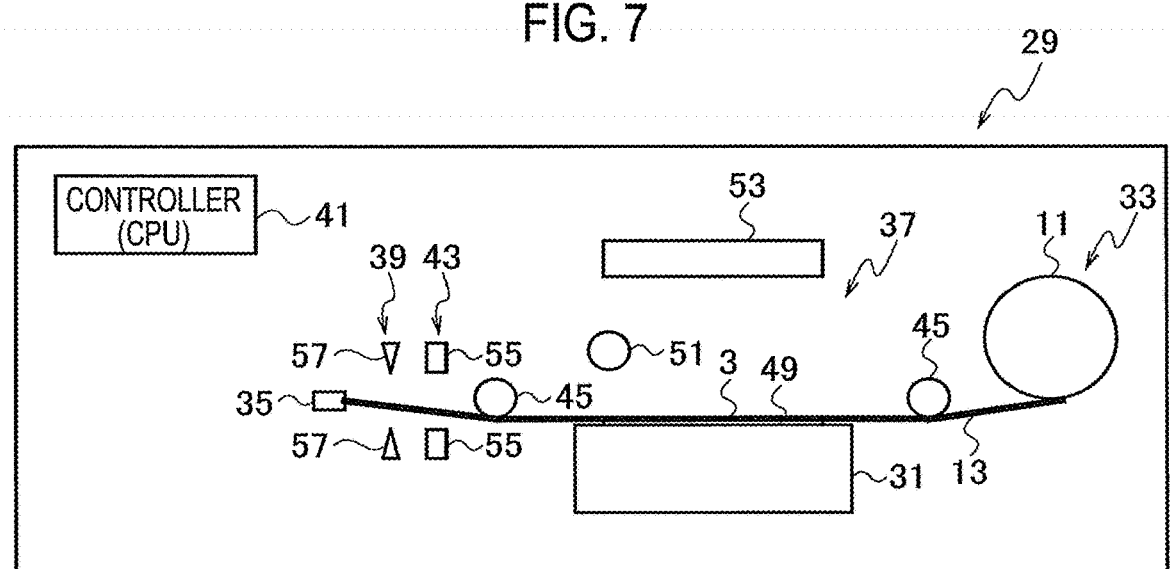

APPARATUS FOR MANUFACTURING MOLDED BODY ASSEMBLY

CROSS REFERENCE TO RELATED APPLICATIONS

This application is a divisional application of U.S. application Ser. No. 14/432,694, filed on Mar. 31, 2015, which was the National Stage of International Application No. PCT/JP2013/075697, filed on Sep. 24, 2013, that claims the priority of Japanese Patent Application No. 2012-219044, filed on Oct. 1, 2012, the entire contents of all of which are incorporated herein by reference.

TECHNICAL FIELD

The present invention relates to an apparatus for manufacturing a molded body assembly in which a fine transfer pattern is transferred from a mold to a to-be-molded body.

BACKGROUND ART

Recently, nanoimprint technologies have been studied and developed (e.g., see "Precision Engineering Journal of the International Societies for Precision Engineering and Nanotechnology 25 (2001) 192-199") in which an ultrafine transfer pattern is formed on a quartz substrate or the like by electron beam lithography or the like to fabricate a template (mold) and in which the template is pressed against a to-be-molded piece with a predetermined pressure to transfer the transfer pattern formed on the template.

For example, as shown in FIG. 12A, a mold 301 and a to-be-molded body 309 are disposed to face each other.

The mold 301 includes a mold base 303 and a transfer pattern formation body 305, and a fine transfer pattern (hereinafter simply referred to as a transfer pattern) 307 is formed in the transfer pattern formation body 305. The to-be-molded body 309 includes a to-be-molded body base 311 and a molding material 313. As the molding material 313, for example, uncured ultraviolet curable resin is employed.

From the state shown in FIG. 12A, the mold 301 is lowered. As shown in FIG. 12B, the mold 301 is brought into contact with the to-be-molded body 309 so that the mold 301 may press the to-be-molded body 309, and the molding material 313 is irradiated with ultraviolet light to be cured.

After that, as shown in FIG. 12D, the mold 301 is separated from the to-be-molded body 309 to obtain the to-be-molded body 309 having a transferred pattern 315.

SUMMARY OF INVENTION

The to-be-molded body 309 having the transferred pattern 315 shown in FIG. 12D is used as, for example, an optical filter for a display unit of a smartphone. However, in the case where the to-be-molded body 309 is transported in the state shown in FIG. 12D and incorporated into a product such as a smartphone, there is the problem that the transferred pattern may be damaged during transportation or incorporation.

The present invention has been made in view of the above-described problem, and an object of the present invention is to provide an apparatus for manufacturing a molded body assembly which allows for minimizing the possibility of damage to a transferred pattern formed in a to-be-molded body by transferring.

An aspect of the present invention is an apparatus for manufacturing a molded body assembly including: a to-be-molded body holder configured to hold a to-be-molded body placed thereon; a raw material roll placement portion in which a mold raw material roll is placed; a mold holder configured to hold a leading edge portion of an uncut mold extending from the mold raw material roll, and to move relative to the to-be-molded body holder; a transfer unit configured to transfer a fine transfer pattern of the uncut mold to the to-be-molded body placed on and held by the to-be-molded body holder; a cutting unit configured to cut the uncut mold at a predetermined position in a longitudinal direction thereof; and a controller configured to control the to-be-molded body holder, the mold holder, the transfer unit, and the cutting unit to: in a state in which the to-be-molded body is placed on and held by the to-be-molded body holder, in which the mold raw material roll is placed in the raw material roll placement portion, and in which the mold holder holds the leading edge portion of the uncut mold, move the mold holder so that the fine transfer pattern of the uncut mold faces the to-be-molded body placed on and held by the to-be-molded body holder and pull out the uncut mold from the mold raw material roll placed in the raw material roll placement portion, cause the transfer unit to transfer the fine transfer pattern of the uncut mold to the to-be-molded body placed on and held by the to-be-molded body holder thereby forming a molded body from the to-be-molded body, cause the to-be-molded body holder to release the to-be-molded body, move the mold holder until the to-be-molded body caused to adhere to the uncut mold by the transferring is separated from the to-be-molded body holder in the longitudinal direction of the uncut mold and further pull out the uncut mold together with the to-be-molded body adhering thereto from the mold raw material roll placed in the raw material roll placement portion, and cause the cutting unit to cut the uncut mold at a predetermined position spaced away from the to-be-molded body adhering thereto in a direction of the mold raw material roll placed in the raw material roll placement portion thereby manufacturing a mold body assembly, the mold body assembly comprising: the molded body; and a mold formed in a shape of a sheet, the mold comprising the fine transfer pattern formed on one surface of the mold facing in a thickness direction of the mold, the mold having a predetermined length by cutting from the uncut mold at the predetermined position, wherein the mold is adhering to the molded body after the transferring, the adhering of the mold to the molded body is maintained, to protect a fine transferred pattern formed in the molded material, the mold is removable from the molded body when the molded body is used as a product or a half-finished product.

The present invention allows for minimizing the possibility of damage to a fine transferred pattern formed in a to-be-molded body by transferring.

BRIEF DESCRIPTION OF DRAWINGS

FIG. 2 is a view showing the operation of the apparatus for manufacturing the molded body assembly according to the embodiment of the present invention.

FIG. 3 is a view showing the operation of the apparatus for manufacturing the molded body assembly according to the embodiment of the present invention.

FIG. 6 is a view showing the operation of the apparatus for manufacturing the molded body assembly according to the embodiment of the present invention.

FIG. 7 is a view showing the operation of the apparatus for manufacturing the molded body assembly according to the embodiment of the present invention.

FIG. 12C is a view schematically showing the configuration of the molded body assembly according to the embodiment of the present invention.

DESCRIPTION OF EMBODIMENTS

Figure 12A:
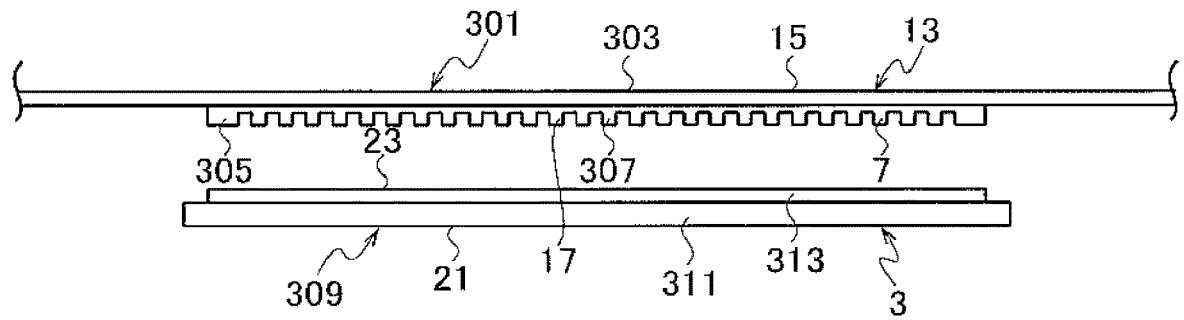
FIGS. 12A to 12D are views for explaining transferring.
Figure 12B:
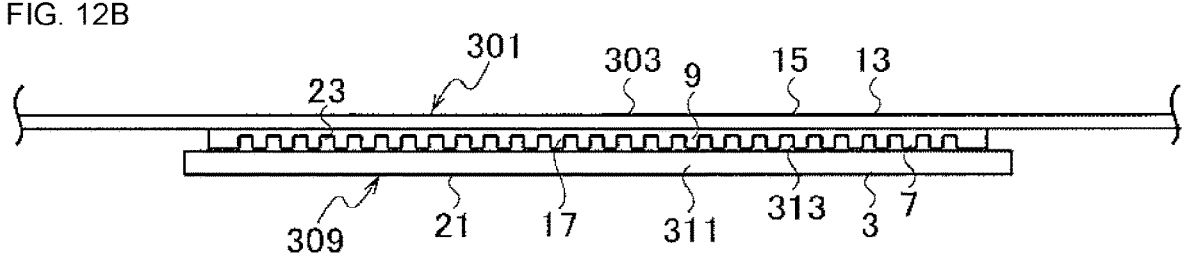
Figure 12C:
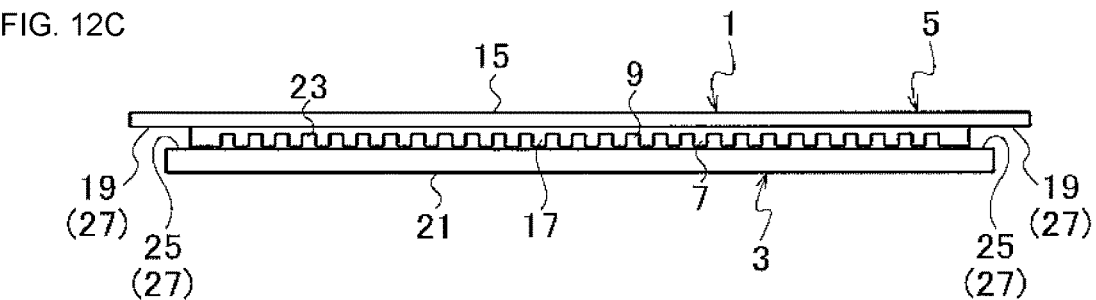

A molded body assembly 1 according to an embodiment of the present invention includes a to-be-molded body 3 and a mold 5 as shown in FIG. 12C.

Each of the to-be-molded body 3 and the mold 5 is formed in the shape of a sheet (film).

The mold 5 has a fine transfer pattern (hereinafter simply referred to as a transfer pattern) 7 formed on one surface thereof facing in a thickness direction thereof. Transferring the transfer pattern 7 causes, for example, the mold 5 to adhere to the to-be-molded body 3 while maintaining a state thereof at the time of transferring. By maintaining this adhesion, a fine transferred pattern (hereinafter simply referred to as a transferred pattern) 9 formed on the to-be-molded body 3 is protected.

The mold 5 can be removed from the to-be-molded body 3. After the transferred pattern 9 is formed on the to-be-molded body 3 and when the to-be-molded body 3 is used as a product or a half-finished product, the mold 5 is removed from the to-be-molded body 3.

In the molded body assembly 1, the mold 5 adheres to the to-be-molded body 3, and the mold 5 and the to-be-molded body 3 are superposed. The thickness direction of the to-be-molded body 3 and the thickness direction of the mold 5 are the same. Moreover, the surface of the mold 5 on which the transfer pattern 7 is formed and the surface of the to-be-molded body 3 on which the transferred pattern 9 is transferred adhere tightly to each other.

The to-be-molded body 3 having the transferred pattern 9 is used as, for example, an optical element such as a filter for an image display unit of a smartphone (multifunctional mobile phone) or a tablet PC (plate-shaped mobile computer). Moreover, the to-be-molded body 3 can also be used as, for example, a wafer or a reticle substrate (e.g., 6025 reticle substrate).

In the molded body assembly 1, transferring is performed using a portion (see FIG. 1 and the like) of a strip-shaped uncut mold (elongated mold) 13 extending from a mold raw material roll (raw material roll) 11 wrapped into a roll.

The mold 5 is formed by cutting the strip-shaped uncut mold 13 extending from the mold raw material roll 11 at a predetermined position in the longitudinal direction thereof.

As shown in FIG. 12C, the dimension of the mold 5 is larger than the dimension of the to-be-molded body 3 in the longitudinal direction (horizontal direction in FIG. 12C of the mold 5. Moreover, two end portions of the mold 5 which are opposite to each other in the longitudinal direction thereof extend (protrude) from two opposite ends of the to-be-molded body 3 by predetermined lengths.

The transfer pattern 7 is formed by lines and spaces having pitches and heights comparable to, for example, wavelengths of visible light. The transfer pattern 7 is transferred to the to-be-molded body 3 by transferring, and the transferred pattern 9 having an inverse shape to that of the transfer pattern 7 is formed in the to-be-molded body 3.

The mold 5 has flexibility. The mold 5 hardly elastically deforms even when a tensile force perpendicular to the thickness direction thereof is applied thereto, and can be regarded as an approximately rigid body. On the other hand, the mold 5 easily deforms such that the mold 5 peels off in the thickness direction thereof, like a banknote or the like. In other words, the mold 5 is easily deformed by a moment about an axis extending in a direction perpendicular to the thickness direction and the longitudinal direction. Accordingly, the mold 5 can be easily peeled off from the to-be-molded body 3 when removed therefrom.

Moreover, the mold 5 includes a sheet-shaped base (mold base) 15 and a transfer pattern formation body 17 (see FIG. 12A).

The sheet-shaped mold base 15 is plate-shaped and made of, for example, resin material such as PET resin which allows ultraviolet light to pass therethrough.

The transfer pattern formation body 17 is in the form of a thin film and is made of, for example, resin which allows ultraviolet light to pass therethrough. The resin constituting the transfer pattern formation body 17 is ultraviolet curable resin, thermosetting resin, thermoplastic resin, or the like. The transfer pattern formation body 17 is provided on one surface of the mold base 15 which faces in the thickness direction thereof, integrally with the mold base 15, such that the thickness direction thereof is the same as the thickness direction of the mold base 15.

The transfer pattern 7 is formed on a surface of the transfer pattern formation body 17. This surface is one surface of the transfer pattern formation body 17 which faces in the thickness direction thereof, and is a surface opposite to the surface in contact with the mold base 15. It should be noted that the transfer pattern 7 is produced by transferring a fine transfer pattern formed on an unillustrated master mold.

The mold base 15 is formed in the shape of, for example, a rectangular plate. The width dimension (dimension in a direction perpendicular to the plane of the drawing of FIG. 12C and the length dimension (dimension in the horizontal direction of FIG. 12C of the mold base 15 are significantly larger than the thickness dimension (dimension in the vertical direction of FIG. 12C of the mold base 15.

The transfer pattern formation body 17 is also formed in the shape of, for example, a rectangular plate. The transfer pattern formation body 17 is provided on the mold base 15 such that the width direction thereof is the same as the width direction of the mold base 15 and that the length direction thereof is the same as the length direction of the mold base 15.

The width dimension of the transfer pattern formation body 17 is smaller than the width dimension of the mold base 15. The center of the transfer pattern formation body 17 in the width direction thereof coincides with the center of the mold base 15 in the width direction thereof.

The length dimension of the transfer pattern formation body 17 is smaller than the length dimension of the mold base 15. The center of the transfer pattern formation body 17 in the length direction thereof coincides with the center of the mold base 15 in the length direction thereof.

Thus, a transfer pattern formation body absent portion (portion including only the mold base) 19 having the shape of a rectangular loop is formed in a peripheral portion of the mold 5.

The to-be-molded body 3 has flexibility, but has higher rigidity than the mold 5. Accordingly, when the mold 5 is removed from the to-be-molded body 3 after the mold 5 is transferred, the to-be-molded body 3 does not easily peel off.

Moreover, the sheet-shaped to-be-molded body 3 includes a sheet-shaped base (to-be-molded body base) 21 and a molding material 23.

The sheet-shaped to-be-molded body base 21 is plate-shaped and made of, for example, resin material such as PET resin. The molding material 23 is in the form of a thin film and is made of resin such as ultraviolet curable resin, thermosetting resin, or thermoplastic resin.

The to-be-molded body base 21 is also formed in the shape of a rectangular plate. The width dimension of the to-be-molded body base 21 is approximately equal to the width dimension of the mold base 15. The length dimension of the to-be-molded body base 21 is smaller than the length dimension of the mold base 15.

The molding material 23 is also formed in the shape of a rectangular plate. The molding material 23 is provided on one surface of the to-be-molded body base 21 which faces in a thickness direction thereof, such that the thickness direction thereof is the same as the thickness direction of the to-be-molded body base 21. Moreover, the width direction of the molding material 23 is the same as the width direction of the to-be-molded body base 21, and the length direction of the molding material 23 is the same as the length direction of the to-be-molded body base 21.

The width dimension of the molding material 23 is smaller than the width dimension of the to-be-molded body base 21. The length dimension of the molding material 23 is also smaller than the length dimension of the to-be-molded body base 21.

The center of the molding material 23 in the width direction thereof coincides with the center of the to-be-molded body base 21 in the width direction thereof. The center of the molding material 23 in the length direction thereof coincides with the center of the to-be-molded body base 21 in the length direction thereof.

Thus, a molding material absent portion (portion including only the to-be-molded body base 21) 25 having the shape of a rectangular loop is formed in a peripheral portion of the molding material 23.

The fine transferred pattern 9 of the molding material 23 is formed on a surface (one surface facing in the thickness direction and a surface opposite to the surface in contact with the to-be-molded body base 21) of the molding material 23 by transferring the transfer pattern 7.

In the case where the molding material 23 is ultraviolet curable resin or thermosetting resin, the molding material 23 before the transfer pattern 7 is transferred is in an uncured state. In other words, the molding material 23 at this time is liquid (depending on the material thereof, viscous liquid).

The molding material 23 starts curing when transferring is started, and fully cures when the transferring is finished.

In the molded body assembly 1, the width direction of the mold base 15 is the same as the width direction of the to-be-molded body base 21. The length direction of the mold base 15 is the same as the length direction of the to-be-molded body base 21.

Moreover, the center of the mold base 15 in the width direction thereof coincides with the center of the to-be-molded body base 21 in the width direction thereof. The center of the mold base 15 in the length direction thereof coincides with the center of the to-be-molded body base 21 in the length direction thereof.

Thus, a no-adhesion portion 27 which has the shape of a rectangular loop and in which the mold 5 is separated from the to-be-molded body 3 is formed in a peripheral portion of the molded body assembly 1.

The mold raw material roll 11 is the strip-shaped uncut mold 13 before used in transferring which is in the state of being wrapped into a roll. In other words, the mold raw material roll 11 is formed in the shape of a cylinder or a column by wrapping the strip-shaped uncut mold 13 around a columnar core such that the circumferential direction of the cylindrical core is the same as the longitudinal direction of the sheet-shaped uncut mold 13.

A plurality of transfer pattern formation bodies 17 are provided on the uncut mold 13 to be spaced at intervals of a predetermined distance in the length direction of the mold base 13 (uncut mold base 15). The uncut mold 13 is cut at a position between adjacent transfer pattern formation bodies 17 to produce the mold 5.

Next, a method of manufacturing and using the molded body assembly 1 will be described.

First, the transfer pattern 7 of the mold 5 is transferred to the to-be-molded body 3 (see FIGS. 12A and 12B; transfer step).

Then, the mold 5 and the to-be-molded body 3 (see FIG. 12C adhering to each other by the transferring in the transfer step are transported to a predetermined place (transporting step). At this time, a state in which the mold 5 and the to-be-molded body 3 adhere to each other is maintained. For example, this state is maintained until a subsequent step is performed or even after the mold 5 and the to-be-molded body 3 are incorporated into a product.

Figure 12D:
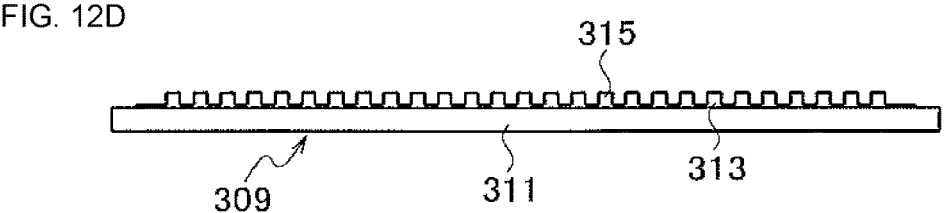

Subsequently, the mold 5 is removed from the molded body assembly 1 transported in the transporting step to expose the transferred pattern 9 formed in the to-be-molded body 3 (see FIG. 12D; removal step).

Next, an apparatus (molded body assembly manufacturing apparatus) 29 for manufacturing the molded body assembly 1 will be described.

Figure 1:
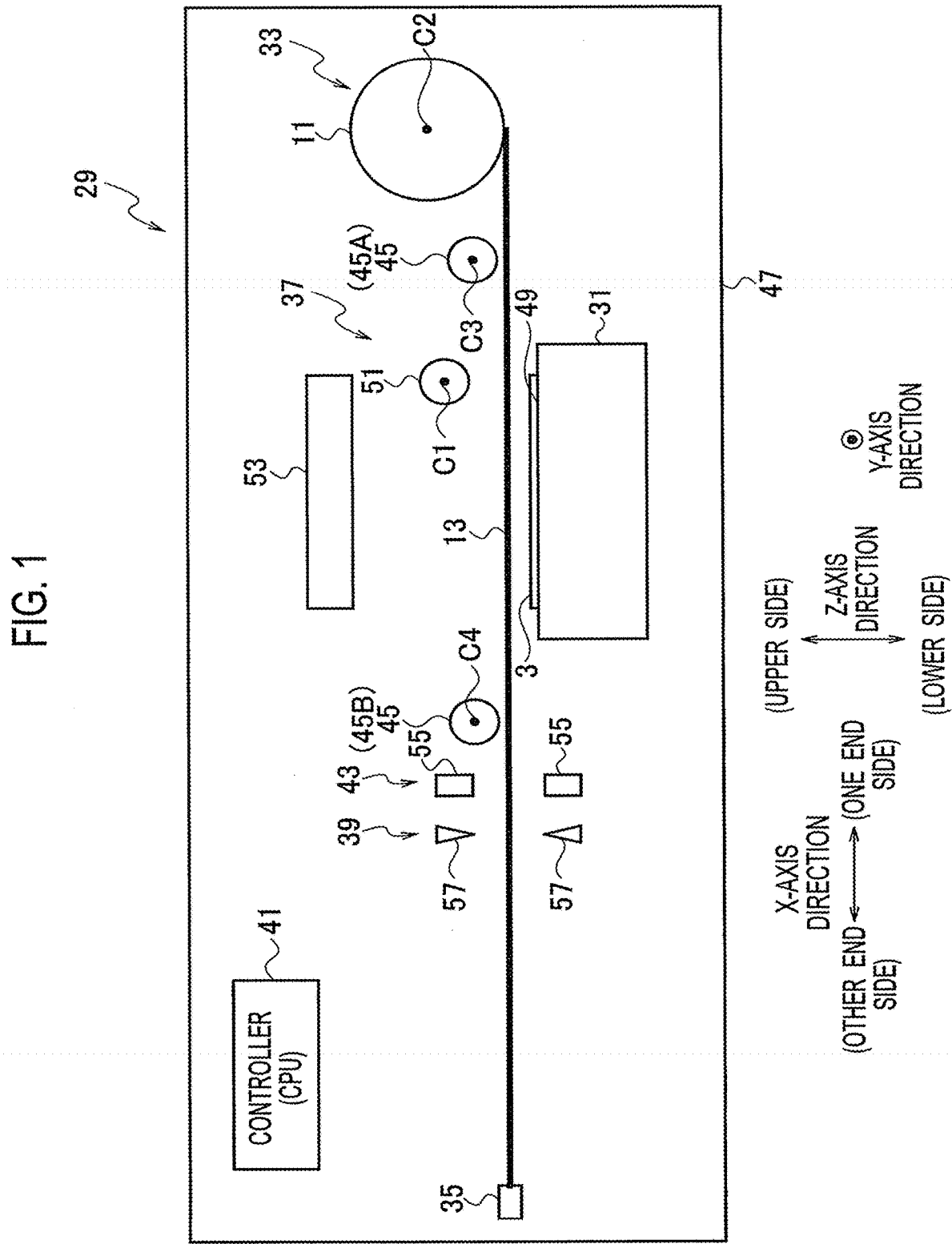
FIG. 1 is a view schematically showing the configuration of an apparatus for manufacturing a molded body assembly according to an embodiment of the present invention.

As shown in FIG. 1 and the like, the molded body assembly manufacturing apparatus 29 includes a to-be-molded body holder 31, a raw material roll placement portion (mold raw material roll placement portion) 33, a mold holder 35, a transfer unit 37, a cutting unit 39, and a controller 41.

The to-be-molded body 3 is placed on the to-be-molded body holder 31. The to-be-molded body holder 31 holds the to-be-molded body 3.

The mold raw material roll 11 is placed in the raw material roll placement portion 33. In a state in which the mold raw material roll 11 is placed in the raw material roll placement portion 33, the position of the rotation axis C2 of the mold raw material roll (placed mold raw material roll) 11 relative to the to-be-molded body holder 31 is fixed. In other words, the rotation axis C2 of the placed mold raw material roll 11 does not move relative to the to-be-molded body holder 31.

The mold holder (mold guiding body) 35 holds a leading edge portion of the uncut mold 13 extending from the mold raw material roll 11, and moves relative to the to-be-molded body holder 31.

The transfer unit 37 transfers the transfer pattern 7 of the uncut mold 13 to the to-be-molded body 3 placed on and held by the to-be-molded body holder 31.

The cutting unit 39 cuts the uncut mold 13 at a predetermined position in the longitudinal direction thereof.

The controller (controller including a CPU) 41 controls the to-be-molded body holder 31, the raw material roll placement portion 33, the mold holder 35, the transfer unit 37, and the cutting unit 39 as follows.

In an initial state (see FIG. 2), the to-be-molded body 3 is placed on and held by the to-be-molded body holder 31. The mold raw material roll 11 is placed in the raw material roll placement portion 33. The uncut mold 13 slightly extends from the mold raw material roll 11. The mold holder 35 holds the leading edge portion of the uncut mold 13 near the mold raw material roll 11.

The mold holder 35 moves so as to pull out the uncut mold 13 from the mold raw material roll 11 until the transfer pattern 7 of the uncut mold 13 faces the to-be-molded body 3 on the to-be-molded body holder 31 (see FIG. 3).

The pulled-out uncut mold 13 is located across the to-be-molded body 3 from the to-be-molded body holder 31. At this time, the uncut mold 13 is, for example, slightly separated from the to-be-molded body 3.

Figure 4:
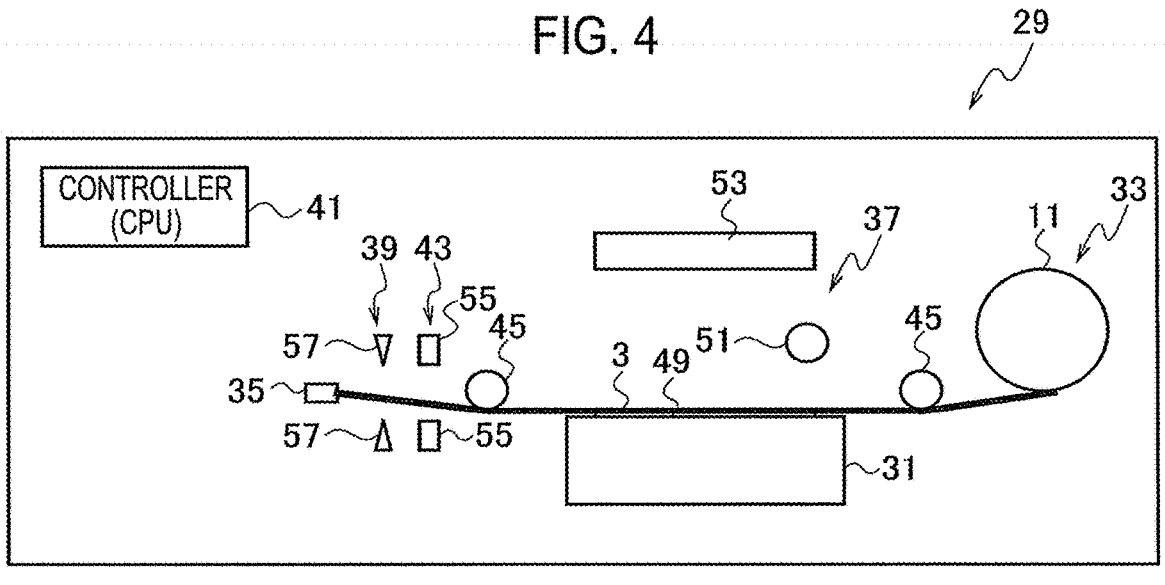
FIG. 4 is a view showing the operation of the apparatus for manufacturing the molded body assembly according to the embodiment of the present invention.
Figure 5:
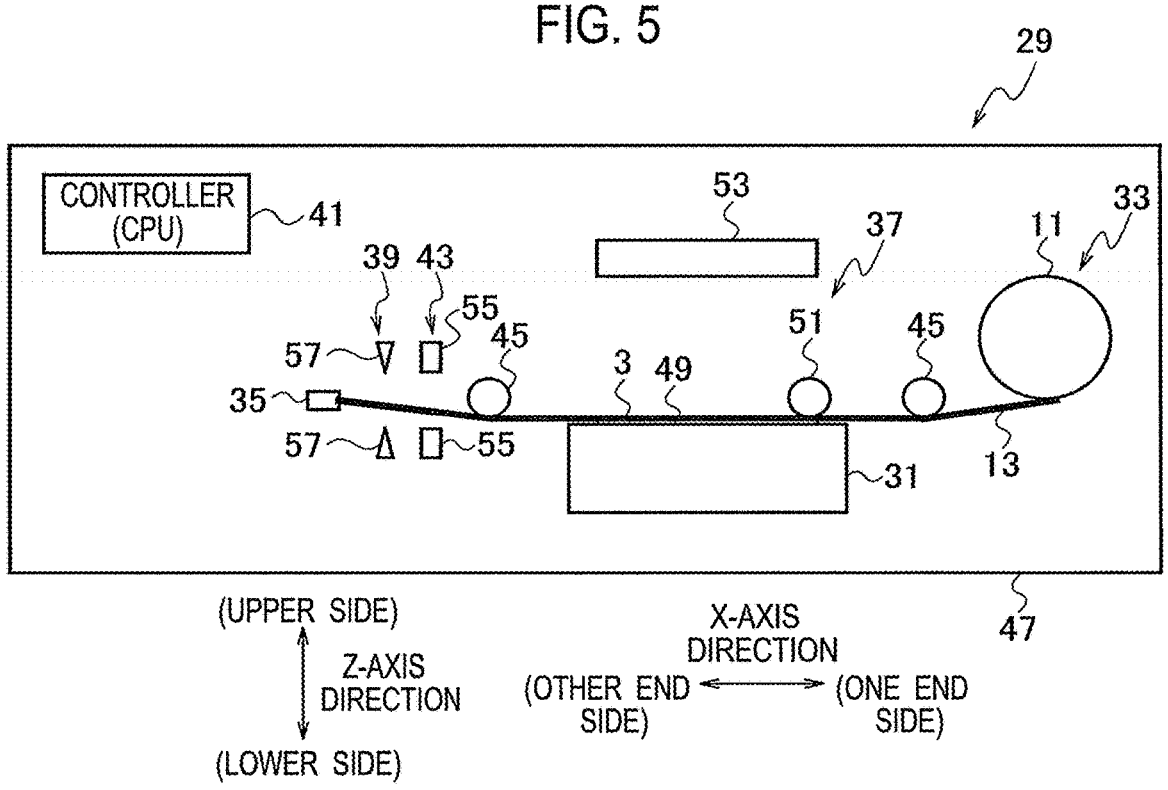
FIG. 5 is a view showing the operation of the apparatus for manufacturing the molded body assembly according to the embodiment of the present invention.

After the pulling out by the mold holder 35, the transfer unit 37 transfers the fine transfer pattern 7 of the uncut mold 13 to the to-be-molded body 3 on the to-be-molded body holder 31 (see FIGS. 7 to 4).

Figure 8:
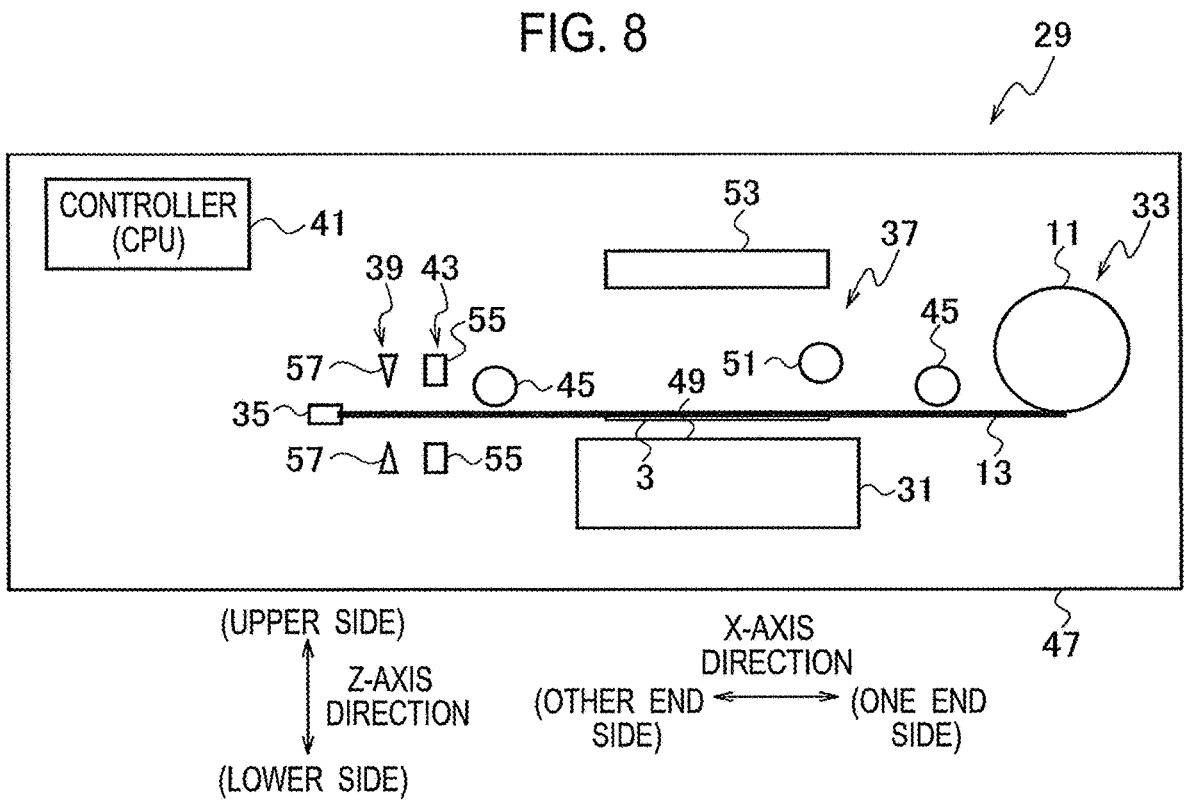
FIG. 8 is a view showing the operation of the apparatus for manufacturing the molded body assembly according to the embodiment of the present invention.

After the transfer unit 37 performs transferring, the to-be-molded body holder 31 releases the to-be-molded body 3 (see FIG. 8). In other words, the to-be-molded body 3 is released from the to-be-molded body holder 31.

Figure 9:
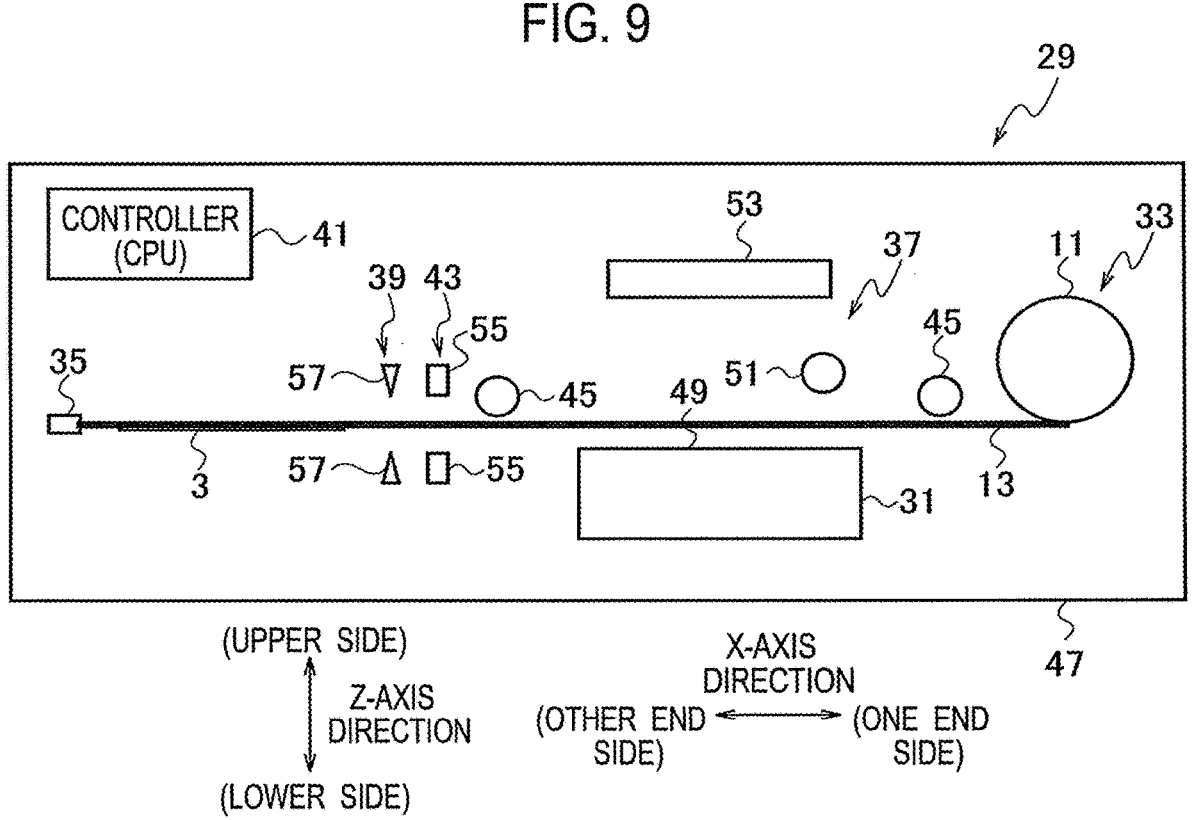
FIG. 9 is a view showing the operation of the apparatus for manufacturing the molded body assembly according to the embodiment of the present invention.

After the to-be-molded body holder 31 has released the to-be-molded body 3, the mold holder 35 further pulls out the uncut mold 13 from the mold raw material roll 11 in a state in which the to-be-molded body 3 still adheres to the uncut mold 13 until the to-be-molded body 3 is separated from the to-be-molded body holder 31 (see FIG. 9).

Figure 10:
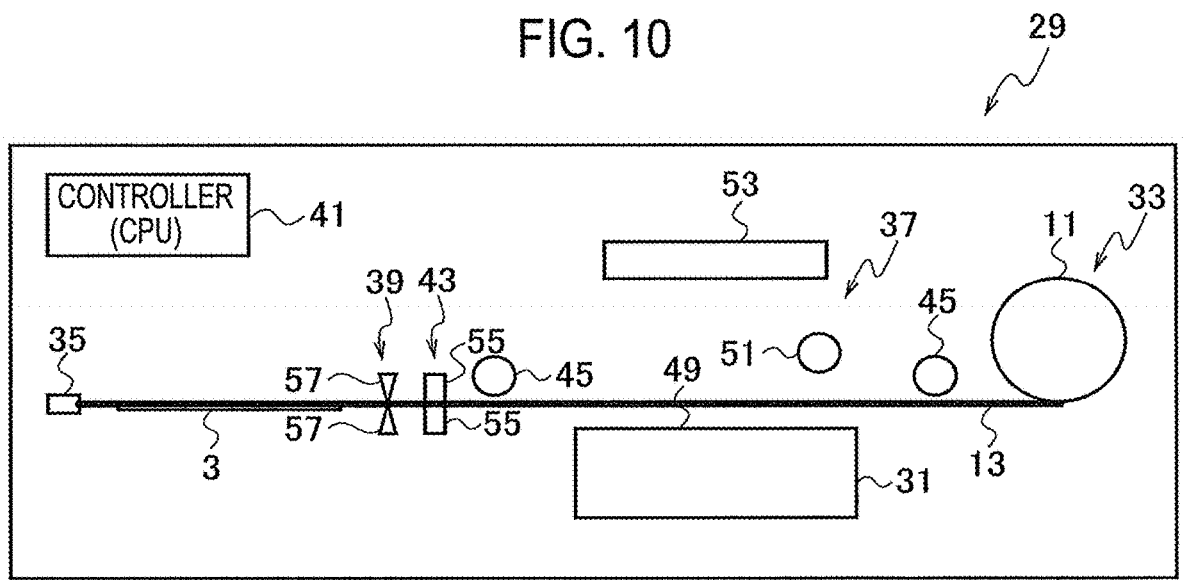
FIG. 10 is a view showing the operation of the apparatus for manufacturing the molded body assembly according to the embodiment of the present invention.
Figure 11:
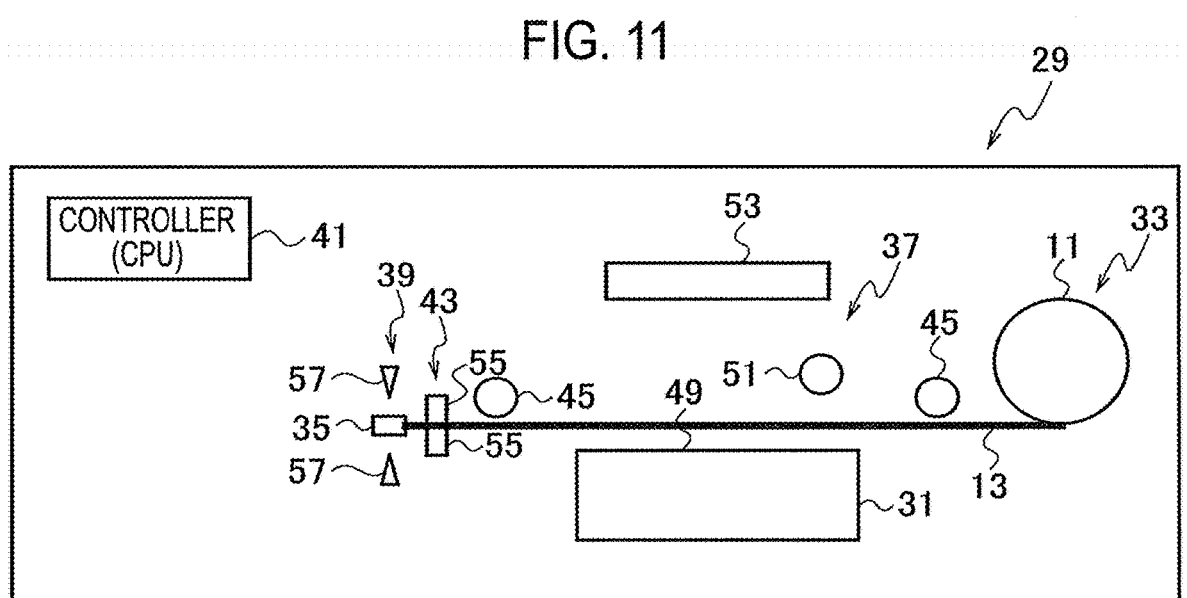
FIG. 11 is a view showing the operation of the apparatus for manufacturing the molded body assembly according to the embodiment of the present invention.

Then, the cutting unit 39 cuts the uncut mold 13 at a predetermined position spaced away from the to-be-molded body 3 having the uncut mold 13 adhering thereto in the direction of the mold raw material roll 11 (see FIGS. 11 and 10).

Thus, the molded body assembly 1 shown in FIG. 12C is obtained.

It should be noted that while the above-described operation is being executed under the control of the controller 41, a predetermined tension is applied to the uncut mold 13 between the mold holder 35 and the mold raw material roll 11 in the longitudinal direction thereof. Accordingly, the uncut mold 13 extends in a no-slack state.

As shown in FIG. 1, a temporarily holding unit 43 and guide rollers 45 (45A, 45B) are provided in the manufacturing apparatus 29.

As shown in FIGS. 10 and 11, the temporarily holding unit 43 holds the uncut mold 13 at a predetermined position in the longitudinal direction thereof under the control of the controller 41 when the cutting unit 39 cuts the uncut mold 13.

When the cutting unit 39 cuts the uncut mold 13 while the temporarily holding unit 43 is holding the uncut mold 13, the to-be-molded body holder 31 (transfer unit 37), the temporarily holding unit 43, the cutting unit 39, the to-be-molded body 3 adhering to the uncut mold 13, and the mold holder 35 are located in this order from a proximal end side (mold raw material roll 11 side) toward a distal end side (mold holder 35 side) of the uncut mold 13 extending from the mold raw material roll 11 (see FIG. 10).

The temporarily holding unit 43 holds the uncut mold 13 even after the cutting is performed by the cutting unit 39. Accordingly, the uncut mold 13 extends between the temporarily holding unit 43 and the mold raw material roll 11 in the longitudinal direction by a predetermined tension in a no-slack state.

After the cutting is performed by the cutting unit 39, the mold holder 35 moves toward the uncut mold 13, and holds a new leading edge portion of the uncut mold 13 (see FIG. 11). Then, the temporarily holding unit 43 releases the uncut mold 13, and the mold raw material roll 11 winds up the uncut mold 13. The winding by the mold raw material roll 11 causes the mold holder 35 to move closer to the mold raw material roll 11. Meanwhile, a new to-be-molded body 3 is placed on the to-be-molded body holder 31 and held by the to-be-molded body holder 31. The above-described operation causes the manufacturing apparatus 29 to return to the initial state of FIG. 2.

The guide rollers 45 (45A, 45B) are provided to be separated across the to-be-molded body holder 31 in the longitudinal direction of the uncut mold 13. The guide rollers 45 are configured to be capable of being moved and positioned in directions toward and away from the to-be-molded body holder 31 under the control of the controller 41.

In the longitudinal direction of the uncut mold 13, one guide roller 45A is slightly separated from one end of the to-be-molded body holder 31, and the other guide roller 45B is slightly separated from the other end of the to-be-molded body holder 31.

When the transfer unit 37 performs transferring, the guide rollers 45 (45A, 45B) appropriately move (guide) the uncut mold 13 toward the to-be-molded body holder 31.

Hereinafter, the molded body assembly manufacturing apparatus 29 will be described in more detail.

For convenience of explanation, a horizontal direction is referred to as an X-axis direction, another horizontal direction perpendicular to the X-axis direction is referred to as a Y-axis direction, and a vertical direction perpendicular to the X-axis direction and the Y-axis direction is referred to as a Z-axis direction.

The molded body assembly manufacturing apparatus 29 includes a base body 47.

The to-be-molded body holder 31 is provided integrally with the base body 47. The to-be-molded body holder 31 has a flat surface (to-be-molded body placement surface) 49 formed at a top thereof. The flat surface 49 is perpendicular to the Z-axis direction. The to-be-molded body 3 is held on the flat surface 49 of the to-be-molded body holder 31 by, for example, vacuum suction.

As described previously, the molding material 23 is provided on one surface of the to-be-molded body base 21 which faces in the thickness direction thereof. When the to-be-molded body 3 is held by the to-be-molded body holder 31, other surface (surface opposite to the molding material 23) of the to-be-molded body base 21 which faces in the thickness direction is in surface contact with the to-be-molded body placement surface 49. Accordingly, the molding material 23 exists on an upper surface of the to-be-molded body base 21.

In a state in which the mold raw material roll 11 is placed in the raw material roll placement portion 33, the mold raw material roll 11 is located above the to-be-molded body holder 31 in the Z-axis direction, and is separated from the one end of the to-be-molded body holder 31 in the X-axis direction. Moreover, the mold raw material roll 11 rotates about the axis C2 extending in the Y-axis direction.

The mold holder 35, for example, grips the leading edge of the uncut mold 13 in the thickness direction thereof to hold the uncut mold 13. The mold holder 35 is located above the to-be-molded body holder 31 in the Z-axis direction.

Moreover, the mold holder 35 is supported by the base body 47 with an unillustrated linear guide bearing interposed therebetween. The mold holder 35 is moved and positioned in the X-axis direction by an unillustrated actuator such as a servomotor.

The raw material roll placement portion 33 applies a rotating torque to the mold raw material roll 11 in a direction in which the uncut mold 13 is wound up, using an actuator such as a motor and a torque limiter.

Thus, a predetermined tension in the X-axis direction is applied to the uncut mold 13 extending between the mold holder 35 and the mold raw material roll 11.

The thickness direction of the uncut mold 13 is the same as the Z-axis direction in a state in which the uncut mold 13 extends between the mold holder 35 and the mold raw material roll 11. Moreover, the length direction (longitudinal direction) of the uncut mold 13 is the same as the X-axis direction. The width direction of the uncut mold 13 is the same as the Y-axis direction. The transfer pattern formation body 17 is located on a lower surface of the mold base 15.

Moreover, the transfer pattern 7 of the uncut mold 13 is superposed on the molding material 23 of the to-be-molded body 3 on the to-be-molded body holder 31 when viewed in the Z-axis direction in a state in which the mold holder 35 is positioned and in which preparation for transferring is completed.

The guide rollers 45 (45A, 45B) are supported by unillustrated guide roller supports, and rotate about axes C3 and C4 extending in the Y-axis direction. The guide roller supports are supported by the base body 47 with unillustrated linear guide bearings interposed therebetween, and are configured to be moved and positioned in the Z-axis direction under the control of the controller 41.

The transfer unit 37 includes a pressure roller 51 and an ultraviolet light generator 53.

The pressure roller 51 is supported by an unillustrated pressure roller support, and rotates about an axis C1 extending in the Y-axis direction. The pressure roller support is supported by the base body 47 with an unillustrated linear guide bearing interposed therebetween, and is configured to be moved and positioned in the Z-axis direction and the X-axis direction under the control of the controller 41.

Moreover, the pressure roller 51 is rotationally driven about the axis C1 by a servomotor such as an actuator.

Specifically, at the time of transferring, the pressure roller 51 is moved and positioned in the Z-axis direction under the control of the controller 41, and grips the to-be-molded body 3 in cooperation with the to-be-molded body holder 31 therebetween to press the to-be-molded body 3. Moreover, the pressure roller 51 moves in the X-axis direction while gripping and pressing the to-be-molded body 3. As a result of this movement, the pressure roller 51 and the uncut mold 13 constitute a rolling pair, and pressed portions on the uncut mold 13 and the to-be-molded body 3 move from the one end side to the other end side in the X-axis direction.

Thus, all the molding material 23 of the to-be-molded body 3 is pressed from the one end toward the other end in the X-axis direction in order.

While the pressure roller 51 is moving in the X-axis direction, the pressure roller 51 rotates at a rotational speed synchronized with the traveling speed in the X-axis direction. This prevents slip between the pressure roller 51 and the uncut mold 13. It should be noted that a configuration may be employed in which the pressure roller 51 rotates in a free state (state in which the pressure roller 51 is not rotationally driven) to prevent the occurrence of the above-described slip.

The ultraviolet light generator 53 emits ultraviolet light toward the molding material 23 in the vicinity of a portion pressed by the pressure roller 51 to cure the molding material 23.

The temporarily holding unit 43 includes a pair of dampers 55. The dampers 55 are moved in the Z-axis direction by an actuator such as a cylinder under the control of the controller 41, and grip the uncut mold 13 in the thickness direction thereof to hold the uncut mold 13.

It should be noted that the dampers 55 are located across the guide roller 45B from the to-be-molded body holder 31 in the X-axis direction.

The cutting unit 39 includes a pair of cutters 57. The cutters 57 are moved in the Z-axis direction by an actuator such as a cylinder under the control of the controller 41, pinch the uncut mold 13 in the thickness direction thereof, and cut the uncut mold 13.

It should be noted that the cutters 57 are located across the dampers 55 from the guide roller 45B in the X-axis direction.

Moreover, the mold holder 35 is located above the to-be-molded body holder 31 and below the guide rollers 45 in the Z-axis direction. Moreover, the mold holder 35 is located between the dampers 55 and between the cutters 57 in the Z-axis direction. Further, the mold holder 35 is configured to move in the X-axis direction.

Next, the operation of the molded body assembly manufacturing apparatus 29 will be described.

As shown in FIG. 2, in the aforementioned initial state, the to-be-molded body 3 is placed on and held by the to-be-molded body holder 31. The uncut mold 13 extends from the mold raw material roll 11 placed in the raw material roll placement portion 33. The leading edge of the uncut mold 13 is held by the mold holder 35. The guide rollers 45 are up. The pressure roller 51 is up and located above the one end in the X-axis direction. The ultraviolet light generator 53 is not emitting ultraviolet light. The dampers 55 and the cutters 57 are open.

From this initial state, the mold holder 35 moves to a position located in the vicinity of the cutters 57 and located on the other end side of the cutters 57 in the X-axis direction under the control of the controller 41 (see FIG. 3). In this state, the transfer pattern formation body 17 (not shown in FIGS. 1 to 11) of the uncut mold 13 is separated from the to-be-molded body 3 and located directly over the to-be-molded body 3.

Then, the guide rollers 45 are lowered (see FIG. 4). In the state shown in FIG. 4, the uncut mold 13 existing between the rollers 45A and 45B is in contact with the to-be-molded body 3.

Subsequently, the pressure roller 51 is lowered to grip the to-be-molded body 3 and the uncut mold 13 in cooperation with the to-be-molded body holder 31 therebetween and press the to-be-molded body 3 and the uncut mold 13. Further, the pressure roller 51 moves from the one end side to the other end side in the X-axis direction. At this time, the ultraviolet light generator 53 emits ultraviolet light to cure the molding material 23. By the above-described series of operations, transferring is performed (see FIGS. 6 and 5).

After that, the pressure roller 51 is raised (see FIG. 7), the to-be-molded body holder 31 stops holding the to-be-molded body 3 (releases the to-be-molded body 3). When the guide rollers 45 are raised, the to-be-molded body 3 is raised while adhering to the uncut mold 13 by a tension of the uncut mold 13, and is separated from the to-be-molded body holder 31 (see FIG. 8).

Then, in a state in which the to-be-molded body 3 still adheres to the uncut mold 13, the mold holder 35 moves until the to-be-molded body 3 is located on the other end side of the cutters 57 (see FIG. 9).

Subsequently, the temporarily holding unit 43 holds the uncut mold 13, and the cutting unit 39 cuts the uncut mold 13 (see FIG. 10).

Then, the cutters 57 are opened, the mold holder 35 stops holding the mold 5 (molded body assembly 1, see FIG. 12C (releases the molded body assembly 1). After that, the molded body assembly 1 is taken out of the molded body assembly manufacturing apparatus 29 using an unillustrated robot or the like. The mold holder 35 holds a new edge portion of the uncut mold 13 in the vicinity of the temporarily holding unit 43 (see FIG. 11).

Then, the temporarily holding unit 43 stops holding the uncut mold 13 (releases the uncut mold 13). After that, the mold holder 35 moves from the other end side to the one end side in the X-axis direction, and the manufacturing apparatus 29 returns to the initial state shown in FIG. 2.

In the molded body assembly 1 of the present embodiment, the transferring of the transfer pattern 7 causes the mold 5 to adhere to the to-be-molded body 3 and protect the transferred pattern 9 formed in the to-be-molded body 3. The mold 5 adheres to the to-be-molded body 3 until the transferred pattern 9 is exposed to the outside. Accordingly, the possibility of damage to the transferred pattern 9 of the to-be-molded body 3 can be minimized without additionally providing a protective film.

The molded body assembly 1 is transported to a back-end process in a state in which the mold 5 adheres to the to-be-molded body 3. Alternatively, the molded body assembly 1 in this state is incorporated into a product as part of the product, transported, and sold. Since the to-be-molded body 3 is protected by the mold 5 adhering to the to-be-molded body 3, there is little risk of damage to the transferred pattern 9.

It should be noted that the mold 5 can be removed from the to-be-molded body 3 as needed.

Moreover, in the molded body assembly 1 of the present embodiment, transferring is performed using part of the uncut mold 13 extending from the mold raw material roll 11, and two opposite end portions of the mold 5 extend from two opposite ends of the to-be-molded body 3 by predetermined lengths. Accordingly, transferring can be efficiently performed, and the mold 5 can be easily removed from the molded body.

The transfer pattern 7 of the mold 5 is not continuously provided in the embodiment, but may be continuously provided. Moreover, the mold is pressed by the pressure roller 51 in the embodiment, but the mold 5 may be pressed using a pressing device having a flat surface.

What is claimed is:

1. An apparatus for manufacturing a molded body assembly, comprising:

a to-be-molded body holder configured to hold a to-be-molded body placed thereon;

a raw material roll placement portion in which a mold raw material roll is placed;

a mold holder configured to hold a leading edge portion of an uncut mold extending from the mold raw material roll, and to move relative to the to-be-molded body holder;

a transfer unit configured to transfer a fine transfer pattern of the uncut mold to the to-be-molded body placed on and held by the to-be-molded body holder;

a cutting unit configured to cut the uncut mold at a predetermined position in a longitudinal direction thereof; and a controller configured to control the to-be-molded body holder, the mold holder, the transfer unit, and the cutting unit to:

in a state in which the to-be-molded body is placed on and held by the to-be-molded body holder, in which the mold raw material roll is placed in the raw material roll placement portion, and in which the mold holder holds the leading edge portion of the uncut mold, move the mold holder so that the fine transfer pattern of the uncut mold faces the to-be-molded body placed on and held by the to-be-molded body holder and pull out the uncut mold from the mold raw material roll placed in the raw material roll placement portion, cause the transfer unit to transfer the fine transfer pattern of the uncut mold to the to-be-molded body placed on and held by the to-be-molded body holder thereby forming a molded body from the to-be-molded body, cause the to-be-molded body holder to release the to-be-molded body, move the mold holder until the to-be-molded body caused to adhere to the uncut mold by the transferring is separated from the to-be-molded body holder in the longitudinal direction of the uncut mold and further pull out the uncut mold together with the to-be-molded body adhering thereto from the mold raw material roll placed in the raw material roll placement portion, and cause the cutting unit to cut the uncut mold at a predetermined position spaced away from the to-be-molded body adhering thereto in a direction of the mold raw material roll placed in the raw material roll placement portion thereby manufacturing a mold body assembly, the mold body assembly comprising:

the molded body; and a mold formed in a shape of a sheet, the mold comprising the fine transfer pattern formed on one surface of the mold facing in a thickness direction of the mold, the mold having a predetermined length by cutting from the uncut mold at the predetermined position, wherein the mold is adhering to the molded body after the transferring, the adhering of the mold to the molded body is maintained, to protect a fine transferred pattern formed in the molded material, the mold is removable from the molded body when the molded body is used as a product or a half-finished product.

* * * * *